Feb. 11, 1936. M. M. YOUNG 2,030,344
PIEPAN
Filed Feb. 27, 1934
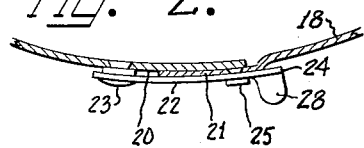
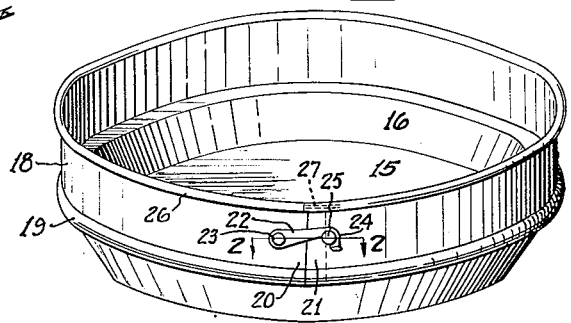
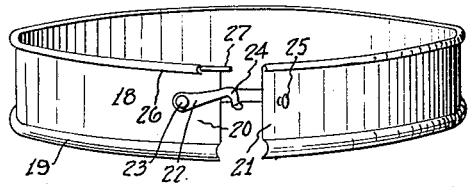
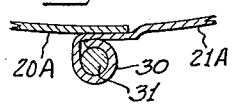
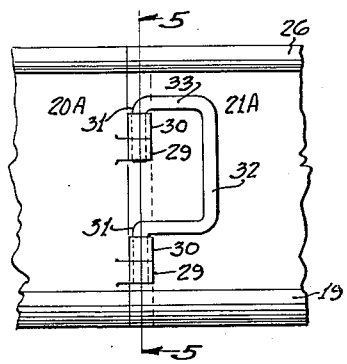
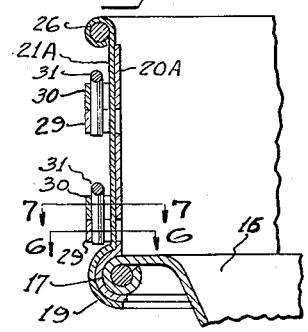
INVENTOR
M. M. YOUNG
BY [signature]
ATTORNEY Patented Feb. 11, 1936

2,030,344

UNITED STATES PATENT OFFICE 2,030,344

PIEPAN

Maude M. Young, Portland, Oreg.

Application February 27, 1934, Serial No. 713,109

1 Claim. (Cl. 53—6)

This invention relates generally to the culinary art, and particularly to pans for baking pies.

The main object of this invention is to provide a pie pan having a removable guard around its edge which will prevent juices from running over the sides of the pan during the baking process.

The second object is to so construct the guard that it is easy to manufacture and to apply or to remove from the pan itself.

The third object is to construct a guard which when applied to the pan becomes rigidly secured thereto, providing a tight joint around the pan rim.

These, and other objects, will become more apparent from the specification following as illustrated in the accompanying drawing, in which:

Fig. 1 is a perspective view of the assembled device.

Fig. 2 is a section taken along the line 2—2 in Fig. 1.

Fig. 3 is a perspective view of the guard in an open position.

Fig. 4 is a fragmentary view showing an alternative form of the joint lock.

Fig. 5 is a vertical section along the line 5—5 in Fig. 4.

Fig. 6 is a section taken along the line 6—6 in Fig. 5.

Fig. 7 is a section taken along the line 7—7 in Fig. 5.

Similar numbers of reference refer to similar parts throughout the several views.

Referring in detail to the drawing, there is shown in the drawing the common form of pie pan 15 whose sloping side 16 terminates in a curled rim 17.

Referring to my device itself same will be seen to consist of a cylindrical guard 18 whose lower edge is provided with a beaded rim 19 which is adapted to engage the outside of the rim 17 when the ends 20 and 21 are over-lapped (as shown in Fig. 1). A latch 22 is provided on the pin 23 which is made fast to the end 20, while the hook portion 24 of the latch 22 engages the pin 25 which is secured to the end 21.

The upper edge 26 of the guard 18 is turned to enclose a wire binding 27, one end of which dowels into the corresponding portion of the edge 26 when the guard is in place.

It can be seen that all that is required to place this guard in position on a pie pan is to so place it that the rim 19 will encircle the rim 17 and then draw the ends 20 and 21 together and latch the hook 24 over the pin 25.

It is desirable to provide the hook 24 with an out-turned end 28 to facilitate the operation thereof.

In Figs. 4 and 5 are shown a very desirable form of joint lock which can be used as a substitute for the latch 22. In this form of the device the guard ends 20A and 21A are provided with ears 29 and 30 which may be brought into register when the guard is in position to be secured. The ears 30 contain the downturned ends 31 of a locking handle 32. The ends 31 are slidable within the ears 30, but cannot be withdrawn therefrom by reason of the fact that the edge 26 acts as a stop for the horizontal portion 33 of the handle 32. In order to lock the ends 20A and 21A together it is only necessary to slide the handle 32 downwardly, in which event the ends 31 will also occupy the ears 29.

In most cases it will be found desirable to make the guard 18 suit a particular size and style of pan without attempting to make them interchangeable for different size pan and shape of rim.

I am aware that numerous attempts have been made to prevent juices from pies from over-running the rims of pans in which they are baked which, for one reason or another, have failed to find their way into popular favor, it is therefore not my intention to limit myself to the precise form of the device shown in the drawing, but intend to cover all forms of the device which fall fairly within the appended claims.

I claim:

A rim for use with pie pans having outwardly turned upper edges, said rim consisting of a split cylindrical body of less diameter than is the outside diameter of the pie pan, the pan engaging edge of said body having a bead formed around same and extending outwardly therefrom and with its innermost face concave to receive the outwardly turned rim of said pie pan, the opposite edge of said body having a wire bead around same, one end of which forms a dowel pin for holding the ends of the edge in alinement and means for urging the split edges of said cylindrical body into an overlapping relationship.

MAUDE M. YOUNG.